Patented June 15, 1937

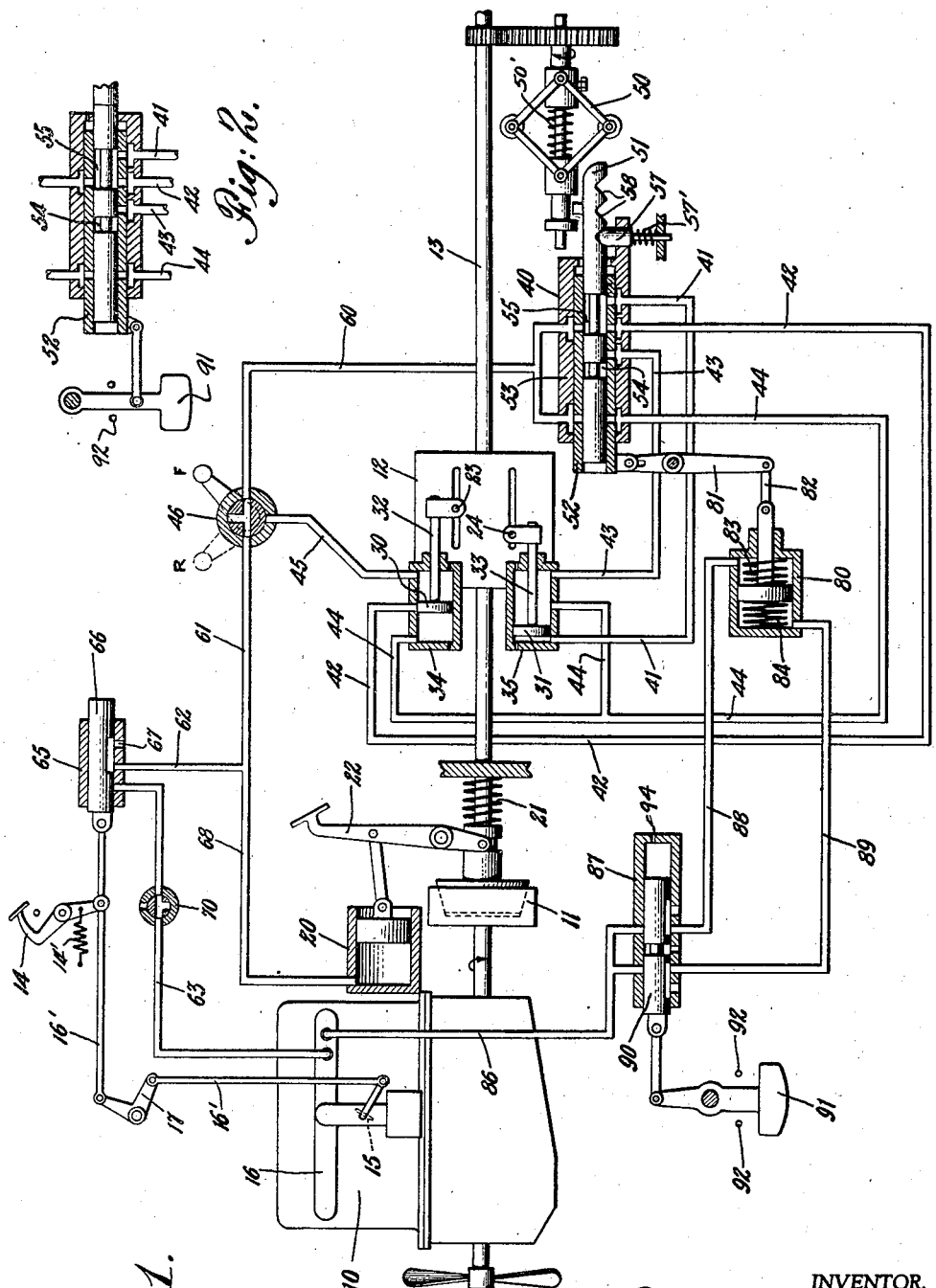

2,084,153

UNITED STATES PATENT OFFICE 2,084,153

FLUID PRESSURE OPERATED GEAR SHIFTING DEVICE

Douglas F. Linsley, Old Greenwich, Conn., assignor to Vaco Products, Inc., a corporation of Delaware Application June 10, 1935, Serial No. 25,855

14 Claims. (Cl. 192—.01)

The present invention relates to automotive vehicles and more particularly to a novel and improved vacuum operated gear shifter for use with such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Figure 1 is a diagrammatic view of an illustrative embodiment of the present invention showing the mechanism in high gear and the vehicle under power; and Figure 2 is a fragmentary view illustrating a modified embodiment of the present invention.

The present invention has for its object the provision of a novel and improved vacuum operated gear shifter for use in automotive vehicles. A further object of the invention is the provision of a novel and improved vacuum operated gear shifter for use with selective gear transmissions in which the application of the vacuum to the gear shifter and a clutch operating cylinder is simultaneously controlled by the operation of a single control element, preferably associated with the engine throttle. Still another object is the provision of a vacuum operated gear shifter controlled by the speed of the vehicle and also by the inclination of the vehicle, so that the gear shifts may be carried out on grades at different speeds from the speeds at which similar shifting operations are performed on the level.

In accordance with the present embodiment of the invention there is provided an internal combustion engine which drives the vehicle through a power operated clutch and a slidable or selective gear transmission having a vacuum operated gear shifter for varying the gear ratio of the transmission under the control of a governor driven proportionally to vehicle speed. The vacuum is rendered available to the clutch operating means and to the gear shifting means by means of a single control, preferably a valve operated in conjunction with the accelerator pedal or engine throttle, so that the vacuum is simultaneously applied both to the clutch and to the gear shifter. The application of vacuum to the gear shifter is also controlled by the vehicle speed by means of a governor positioned selector valve, and means are provided for varying the relation or effect of the selector valve so that the gear shifting operations are performed at one vehicle speed on level ground and are performed at different vehicle speeds on grades. Thus, for example, the vehicle may reach 15 M. P. H. on the level before its transmission gears are shifted to high speed position, while when ascending a steep grade, the shift may not take place until the vehicle speed has reached 20 M. P. H. Similarly, in shifting to a lower gear ratio, on the level the gears may be shifted to intermediate speed from high speed position at 15 M. P. H., while in ascending a grade, the same shift may take place when the vehicle speed has been reduced to below 20 M. P. H. When descending a grade, the shift to or from a lower gear ratio takes place at a lower-than-normal speed, or for instance, the shift from second to third speed may take place at 10 or 12 M. P. H. where the normal shifting speed is 15 M. P. H.

It will be understood that the foregoing general description and the following detailed description as well are exemplary and explanatory of the invention but are not restrictive thereof.

In the accompanying drawing, the present embodiment of the invention is shown in connection with a conventional type of vacuum operated gear shifter but it is equally applicable to other types and to transmissions having more than three forward speeds. Furthermore, certain features of the invention may be utilized in conjunction with a manually or independently operated clutch.

Referring now in detail to the illustrative embodiment of the invention as shown in the accompanying drawing, there is provided an internal combustion engine 10 for driving the vehicle through the clutch 11, selective gear transmission 12, and propeller shaft 13. As the construction, purpose and operation of these parts is well known, they will not be described in detail.

The supply of fuel to the engine is controlled by means of an accelerator pedal 14, normally returned to closed throttle position by means of a spring 14', and connected with a suitable valve 15 in the engine intake manifold 16 by means of links 16' and bell crank 17. As the pedal 14 is depressed, more fuel is delivered to the engine and the speed and power of the engine is increased.

The clutch 11 is provided with a vacuum cylinder 20 connected therewith so that as vacuum is applied to the cylinder, the clutch is disengaged against the pressure of the spring 21 which tends to hold the clutch in its normal position of engagement. A clutch pedal 22 is also provided for manual operation of the clutch, independently of any power actuation.

As is usual in selective gear transmissions, there are provided two shifter rods 23 and 24, rod 23 serving to mesh the transmission gears for low and reverse speed operations, while rod 24 meshes the gears for intermediate and high speeds.

Means are provided for sliding the gear shifting rods 23 and 24 to effect the various gear shifting operations and for this purpose pistons 30 and 31 are fixedly connected with gear shifting rods 23 and 24 by means of piston rods 32 and 33. Vacuum cylinders 34 and 35 are provided for the pistons 30 and 31 and means are provided for selectively applying vacuum to the ends and centers of the vacuum cylinders 34 and 35, and comprises a vehicle speed controlled selector valve 40 positioned between the engine intake manifold 16 and the vacuum cylinders.

Selector valve 40 is connected with the cylinders by means of various vacuum lines, as follows: Vacuum line 41 is connected to the forward portion of cylinder 35 and serves to apply vacuum to the piston 31 to move the gear shifting rod 24 to high speed position. Vacuum line 42 is connected to the mid-portion of vacuum cylinder 34 and serves to move the low speed and reverse piston 30 to neutral position. Vacuum line 43 is connected to the rear end of vacuum cylinder 35 and serves to apply vacuum to the piston 31 to move it to intermediate speed position. Vacuum line 44 is connected both to the forward end of cylinder 34 and to the mid-portion of cylinder 35 and serves to move the piston 31 to neutral position and the piston 30 to low speed position. The rear end of cylinder 34 is connected to the engine intake manifold 16 by means of vacuum line 45 and manually controlled valve 46, when valve 46 is in reverse position, this same action also serving to prevent application of vacuum through the selector valve 40. Conventional means (not shown) are provided for preventing movement of either slide rod 23 or 24 when the other slide rod is not in neutral position. Any suitable means may be provided for venting the cylinders 34 and 35 when shifting, but as shown, simple vent holes are provided in the end walls.

Means are provided for controlling the position of the selector valve 40 in accordance with vehicle speed and thereby controlling the shifting of gears in conformity with and to meet the requirements of the particular speed at which the vehicle is held. For this purpose, a governor 50 is geared to and driven by a propeller shaft 13 and moves against the compression of spring 50', and is connected with the selector valve slide 51 to move the valve slide as the vehicle speed changes, valve slide 51 being moved to the right upon acceleration of the vehicle and being moved to the left as the vehicle slows down. Valve slide 51 is slidably mounted within a valve sleeve 52 which in turn is slidably mounted within the fixed valve body 53. Valve sleeve 52 on the exhaust side is provided with two ports to register with the valve openings in valve body 53, and on the intake side is provided with four openings to register with the ports in valve body 53 corresponding to the vacuum lines 41, 42, 43 and 44. Valve slide 51 is provided with two valving portions 54 and 55 of reduced diameter spaced from each other and so positioned that when the vehicle is stationary or travelling at very low speed, reduced portion 54 is positioned oppositely the port corresponding to vacuum line 44, and at a slightly faster speed the reduced portion 55 is positioned in register with the ports corresponding to vacuum lines 42 and 43, while at higher vehicle speeds the portion 55 is positioned in register with ports 41 and 42. Valve sleeve 52 can move independently of body 53 and slide 51, and thereby varies the effective action of the governor.

Suitable means are provided for definitely positioning the valve slide 51 in one of its alternative positions and for this purpose a detent 57, pressed upwardly by spring 57' is provided engageable with one or the other of the notches 58.

Vacuum is applied to the exhaust side of the selector valve 40 by means of vacuum lines 60, 61, 62 and 63, which is connected to the engine intake manifold 16 and is under the control of various valves as will be later described.

Means are provided for simultaneously applying vacuum to the clutch-operating cylinder 20 and to the gear shifter selector valve 40, and these means are preferably controlled by the operation of the accelerator pedal 14 or other fuel control element. As embodied, a valve 65 is interposed between the vacuum lines 62 and 63, and when the accelerator is closed, valve slide 66 connects lines 62 and 63, while opening the accelerator closes line 63 and bleeds line 62 to atmosphere through valve port 67. Vacuum line 62 is branched and line 68 is connected to it and to the closed end of the clutch-operating cylinder 20 so that when the accelerator is closed, clutch 11 is disengaged by the application of vacuum to clutch-operating cylinder 20, and vacuum is also applied to the selector valve 40 and through one or the other of vacuum lines 41, 42, 43 or 44 is applied to one of the cylinders 34 or 35. Due to the length of piping connecting the vacuum cylinders 34 and 35 with the vacuum line 62, which is longer than the piping 68, the vacuum is effective to operate the clutch cylinder 20 and disengage the clutch before the gear-shifting operation takes place, thereby preventing clashing of the gears and insuring a smooth, quiet shift.

Means are provided for optionally silencing or rendering ineffective the power operation of the clutch and gear-shifting mechanism regardless of the condition of the accelerator pedal, and for this purpose a valve 70 is provided positioned between the intake manifold and the accelerator controlled valve 65, permitting the vacuum to be shut off so that the car will remain in compression regardless of the vehicle speed or position of the accelerator pedal.

For varying the speed at which the gear shifting operations take place in accordance with the inclination of the vehicle, so that in ascending a grade the gears may be shifted from high to intermediate speeds at a higher vehicle speed, means are provided for moving the valve sleeve 52 in accordance with the grade or vehicle inclination. As shown in Figure 1, a double-ended vacuum cylinder 80 is provided and its piston is connected to reciprocate valve sleeve 52 by means of pivoted lever 81 and link 82. Springs 83 and 84 are provided for centering the piston and holding it in its normal position as shown in this figure. Cylinder 80 is connected with the engine intake manifold 16 by means of a vacuum line 86, valve 87 and vacuum lines 88 and 89, these lines being connected to opposite ends of the cylinder 80. Valve 87 is provided with a valve slide 90 which serves to connect lines 88 and 89 alternatively to line 86, and to bleed the unconnected line to atmosphere, and valve slide 90 is connected to a pivoted pendulum 91 adapted to swing forwardly or rearwardly of the vehicle. Stops 92 are provided for limiting movement of the pendulum. When the vehicle is ascending a grade, the pendulum 91 is swung to the rear of the car, connecting vacuum line 89 with line 86 and serving to move the valve sleeve 52 rearwardly to effect a valving action the same as though the vehicle were being driven at a lower than actual speed.

The closed end of valve 87 may be provided with a venting aperture 94, thereby providing a dashpot for the valve slide 90 and preventing too free or sudden movement of the valve upon acceleration or deceleration of the vehicle.

The ports in the valve body 53 are axially elongated adjacent to the openings in the valve sleeve 52 so as to register with the sleeve opening when the sleeve is moved from its normal position as when the sleeve is in its normal position.

In Figure 2 of the drawing is disclosed a slightly modified embodiment of the invention in which the valve sleeve 52 is directly connected with the pivoted pendulum 91, and no servo-motor means is employed for moving the valve sleeve 52. The grade determines the extent of movement of pendulum 91 and valve sleeve 52, thereby changing the valve action in accordance with the steepness of the grade. In other respects, the construction may be similar to that shown in Fig. 1.

In Fig. 1 of the drawing, the vehicle is shown as being driven in high gear, the throttle is partially open, the clutch is engaged and the transmission is in high gear while the pendulum 91 is in the position assumed by it on a level road.

When the vehicle is proceeding at normal speed, say 20 miles per hour, the governor and valve slide 51 are in the position shown, applying suction to the neutral pipe 42 for cylinder 34 and to the high speed pipe 41 for the cylinder 35. As the vehicle decelerates, valve slide 51 is moved to the left until the ports corresponding to lines 42 and 43 are uncovered at say 15 M. P. H. When the accelerator pedal 14 is next released, vacuum is applied to the clutch-operating cylinder 20 as well as to the pipes 42 and 43, shifting the transmission to intermediate speed, and when the accelerator pedal 14 is next depressed, clutch cylinder 20 is bled, causing engagement of the clutch 11.

In ascending a grade, the pendulum 91 swings rearwardly, causing suction to be applied through line 89 to the forward face of the piston within cylinder 8, thereby causing the sleeve 52 to be moved to the right so that the intermediate speed 43 is uncovered at a higher vehicle speed.

Similarly, in descending a grade, the pendulum 91 moves forwardly so as to move the valve sleeve 52 to the left and cause the shift from intermediate to high, or from high to intermediate, to take place at a speed lower than normal.

The invention in its broader aspects is not limited to the specific mechanisms shown and described but departures may be made therefrom within the scope of the accompanying claims, without departing from the principles of the invention and without sacrificing its chief advantages.

What I claim is:—

1. In an automotive vehicle, the combination of a shiftable gear transmission, fluid pressure operated gear shifting means, a vehicle speed controlled selector valve controlling the application of fluid pressure to the gear shifting means and means controlled by the inclination of the vehicle for varying the effective position of the valve.

2. In an automotive vehicle, the combination of a shiftable gear transmission, vacuum operated gear shifting means, a selector valve controlling the application of vacuum to the gear shifting means, means controlled by the vehicle speed for moving said valve and means controlled by the inclination of the vehicle for varying the effective position of the valve.

3. In an automotive vehicle, the combination of a shiftable gear transmission, vacuum operated gear shifting means, a selector valve controlling the gear shifting means, means controlled by the vehicle speed controlling said valve and means operated by the inclination of the vehicle for modifying the effective relation of the valve to the vehicle speed controlled means.

4. In an automotive vehicle, the combination of a shiftable gear transmission, an internal combustion engine, vacuum operated means for shifting the transmission gears, a governor driven in accordance with the vehicle speed, a selector valve controlling the application of vacuum to the gear shifter, means for moving the selector valve by said governor, a sleeve within said valve for varying the action of said valve and means controlled by the inclination of the vehicle for moving said sleeve.

5. In an automotive vehicle, the combination of a shiftable gear transmission, an internal combustion engine, vacuum operated means for shifting the transmission gears, a governor driven in accordance with the vehicle speed, a selector valve controlled by said governor and controlling the application of vacuum to the gear shifter, means for modifying the selection by the governor and means controlled by the inclination of the vehicle for controlling the modifying means.

6. In an automotive vehicle, the combination of a shiftable gear transmission, an internal combustion engine, vacuum operated means for shifting the transmission gears, a governor driven in accordance with the vehicle speed, a selector valve controlled by said governor and controlling the application of vacuum to the gear shifter, a servo-motor also controlling said valve and means controlled by the inclination of the vehicle for varying the operation of said servo-motor.

7. In an automotive vehicle, the combination of a shiftable gear transmission, vacuum operated gear shifting means, a vehicle speed controlled selector valve controlling the application of vacuum to the gear shifting means, means controlled by the inclination of the vehicle for varying the effective position of the valve, a throttle controlling the fuel supply to the engine, a vacuum operated clutch connecting the engine and transmission, and a valve controlled with the throttle and controlling the application of vacuum to the clutch and gear shifter.

8. In an automotive vehicle, the combination of a shiftable gear transmission, vacuum operated gear shifting means, a selector valve controlling the gear shifting means, means controlled by the vehicle speed controlling said valve, means operated by the inclination of the vehicle for modifying the effective relation of the valve to the vehicle speed controlled means, a member controlling the fuel supply to the engine, a vacuum operated clutch connecting the engine and transmission, and a valve controlled by said controlling member and controlling the application of vacuum to the clutch and gear shifter.

9. In an automotive vehicle, the combination of a shiftable gear transmission, an internal combustion engine, vacuum operated means for shifting the transmission gears, a governor driven in accordance with the vehicle speed, a selector valve controlled by said governor and controlling the application of vacuum to the gear shifter, means for modifying the selection by the governor, means controlled by the inclination of the vehicle for controlling the modifying means, a member controlling the fuel supply to the engine, a vacuum operated clutch connecting the engine and transmission, and a valve controlled by said controlling member and controlling the application of vacuum to the clutch and gear shifter.

10. In an automotive vehicle, the combination of a shiftable gear transmission, vacuum operated gear shifting means, a selector valve controlling the application of vacuum to the gear shifting means, means controlled by the vehicle speed for moving said valve, means controlled by the inclination of the vehicle for varying the effective position of the valve, a throttle controlling the fuel supply to the engine, a vacuum operated clutch connecting the engine and transmission, and a valve opened with the closing of the throttle for applying vacuum to the clutch and gear shifter.

11. In an automotive vehicle, the combination of a shiftable gear transmission, an internal combustion engine, vacuum operated means for shifting the transmission gears, a governor driven in accordance with the vehicle speed, a selector valve controlling the application of vacuum to the gear shifter, means for moving the selector valve by said governor, a sleeve within said valve for varying the action of said valve, means controlled by the inclination of the vehicle for moving said sleeve, a throttle controlling the fuel supply to the engine, a vacuum operated clutch connecting the engine and transmission, and a valve opened with the closing of the throttle for applying vacuum to the clutch and gear shifter.

12. In an automotive vehicle, the combination of a shiftable gear transmission, an internal combustion engine, vacuum operated means for shifting the transmission gears, a governor driven in accordance with the vehicle speed, a selector valve controlled by said governor and controlling the application of vacuum to the gear shifter, a servo-motor also controlling said valve, means controlled by the inclination of the vehicle for varying the operation of said servo-motor, a throttle controlling the fuel supply to the engine, a vacuum operated clutch connecting the engine and transmission, and a valve opened with the closing of the throttle for applying vacuum to the clutch and gear shifter.

13. In a vacuum operated gear shifter, the combination of a vehicle speed controlled valve, a valve slide for modifying the action of said valve, and gravitationally controlled means for moving said slide when the vehicle is on a grade.

14. In a vacuum operated gear shifter, the combination of a vehicle speed controlled valve, a valve slide for modifying the action of said valve, a vacuum means for moving said slide independently of the governor and gravitationally controlled means controlling the application of vacuum to the slide moving means.

DOUGLAS F. LINSLEY.